Patented Feb. 9, 1937

2,070,253

UNITED STATES PATENT OFFICE 2,070,253

CORN STARCH DEXTRINE RE-MOISTENING GUM

Thomas A. Bruce, Western Springs, Ill., assignor to International Patents Development Company, Wilmington, Del., a corporation of Delaware No Drawing. Application September 29, 1934, Serial No. 746,149

9 Claims. (Cl. 127—32)

This invention relates to pastes having the characteristics of re-moistening gums; and the primary object of the invention is to provide a method whereby pastes having these characteristics may be produced from corn starch dextrines.

The term "re-moistening gum" is applied to adhesives which in the form of dry films will have adequate adhesiveness when moistened with water. Gums of this sort are used for envelopes, postage stamps, adhesive paper tape, and like articles; and the characteristics required are that the material will be and remain fluid when cold, will form a smooth, glossy, flexible and non-hygroscopic film when spread on paper and dried, and that when the dried film is re-moistened, it will have good tack and good bond. By "tack" is meant capacity for immediate adherence without excessive or prolonged pressure. By "bond" is meant the permanence and strength of the adherence.

A satisfactory paste, having the characteristics of a re-moistening gum, can be produced by cooking, at atmospheric pressure, tapioca starch dextrine mixed with water. This method of making pastes intended for re-moistening films has been practiced for many years; but it has never been possible, so far as I am aware, to produce pastes having similar characteristics from corn starch dextrines. I have discovered, however, that a paste may be produced from ordinary commercial dry roasted corn starch dextrines which will be fluid after several days standing, will coat paper with a smooth, glossy and flexible film, and will have excellent tack and bond when-remoistened, provided, however, that the dextrine, instead of being cooked at atmospheric pressure, as has been customary with tapioca dextrine, is cooked under steam pressures substantially above atmospheric pressure.

I have also discovered that it is desirable, if the best results are to be obtained, to cook the dextrine and water mixture at a pH somewhat higher than the pH of ordinary commercial corn dextrines, which latter because of their methods of manufacture, i. e. roasting with acid, have a strong acid reaction. Hence, in carrying out the process with the common commercial corn dextrines, it is preferable to neutralize the acid to some extent before the cooking operation is performed. I have found a desirable pH for the cooking operation is in the neighborhood of 3.0 to 3.5. The neutralization of the acid may be brought about by use of any suitable neutralizing agent such as sodium hydroxide.

*Example*

60 parts by weight of Corn Products Refining Company dextrine Code No. 158 or of Code No. 231 are mixed with 40 parts of water, cooked in a pressure cooker under about 25 pounds steam pressure per square inch for about twenty minutes. Any suitable vessel may be used for this operation. The heat may be applied to the outside of the vessel, by means, for example, of a steam jacket, or the material may be heated by injection of live steam into the vessel. The proportion of dextrine to water may be varied considerably, for example, according to my experience from 40 to 65 dextrine and from 60 to 35 water. Excellent results have been produced by mixing 50 parts of dextrine with 50 parts of water instead of the sixty to forty proportion specified, and cooking as above described.

As a general rule, the higher the dry substance content of the paste, the stronger will be the bond; while lowering the dry substance content of the paste, the dry film is made more flexible. The proportion of dextrine to water depends, therefore, upon the particular characteristics desired in the final product, the dried film.

Generally speaking, to obtain a like result, if the steam pressure is less, the duration of the cooking should be increased. Practical steam pressures are from 10 pounds per square inch to 50 pounds; and the cooking time may vary from 10 minutes to 60 minutes.

Preferably the mixture of water and dextrine (if an acid roasted dextrine is used) is treated with a solution of sodium hydroxide or other neutralizing agent in quantities sufficient to raise the pH to about 3.0 or 3.5. By raising the pH the tendency of the dextrine to be converted into dextrose under the high pressure and temperature used for pasting is minimized. This results in improved tack and bond and makes the dry film less susceptible to atmospheric humidity.

It would appear that the cooking of the paste at the relatively high pressures indicated makes it possible to very substantially increase the amount of dextrine in the paste without proportionate decrease of fluidity of the finished product. That is, the adhesive properties are increased without having the paste stiff and unworkable.

Corn Products Refining Company dextrine Code No. 158, referred to above, is a white dextrine made by roasting, in a steam jacketed vessel, dry powdered corn starch that has been sprayed with hydrochloric acid to give the starch an acidity of 0.168% to 0.175%, calculated as hydrochloric acid. The starch is roasted at a temperature produced by 40 pounds steam pressure in the jacket until the product is 65% soluble. The steam pressure is then reduced to 10 pounds until the dextrine is about 85% soluble. The time of cooking is about 7 to 9 hours. The soluble substances in the finished dextrine may, however, vary from 80% to 90%. The fluidity of the product is 27 to 36 on the basis of 3 parts by weight of the dry substance product to 4 parts of water, using the so-called C. P. R. method described by Hambden Buel, in "Original Communications, Eighth International Congress of Applied Chemistry", Vol. XIII, page 63.

Corn Products Refining Company dextrine Code No. 231, above referred to, is a cream colored dextrine made by roasting powdered corn starch in a coil type of cooker. The starch is sprayed with hydrochloric acid to an acidity of 0.150% to 0.164%. The steam pressure on the cooker is about 150 pounds. The time in the cooker is about 2½ hours. 97% or more of the finished product is soluble. The fluidity is 12 to 14 on basis of 1 part dry substance product to 1 part of water.

These two commercial corn starch dextrines are given as typical. Other dry roasted corn starch dextrines might be used for making paste in accordance with the present invention.

It is the intention to cover all modifications of method and product within the scope of the appended claims.

I claim:

1. Method of making a paste having, when in the form of a dry film, the characteristics of a re-moistening gum which consists in cooking dry roasted corn starch dextrine and water under a pressure substantially above atmospheric pressure.

2. Method of making a paste having, when in the form of a dry film, the characteristics of a re-moistening gum which consists in cooking dry roasted corn starch dextrine and water under a steam pressure of about 25 pounds per square inch for about 20 minutes.

3. Method of making a paste having, when in the form of a dry film, the characteristics of a re-moistening gum which consists in cooking dry roasted corn starch dextrine and water under a steam pressure between 10 pounds and 50 pounds per square inch for from 10 to 60 minutes.

4. Method of making a paste having, when in the form of a dry film, the characteristics of a re-moistening gum which consists in cooking dry roasted corn starch dextrine and water in approximately equal proportions under a steam pressure substantially above atmospheric pressure.

5. Method of making a paste having, when in the form of a dry film, the characteristics of a re-moistening gum which consists in cooking dry roasted corn starch dextrine and water in approximately equal proportions under about 25 pounds steam pressure for about 20 minutes.

6. Method of making a paste having, when in the form of a dry film, the characteristics of a re-moistening gum which consists in cooking a mixture of from 40 to 65 parts, by weight of dry roasted corn starch dextrine and 60 to 35 parts of water under a steam pressure between 10 pounds and 50 pounds per square inch for a period of from 10 to 60 minutes.

7. Method of making a paste having, when in the form of a dry film, the characteristics of a re-moistening gum which consists in mixing dry roasted corn starch dextrine and water, adjusting the pH to about 3.0 or 3.5 and cooking the material under pressure substantially above atmospheric pressure until a paste is formed.

8. Corn starch dextrine paste composed of dry roasted corn starch dextrine cooked at a pressure substantially above atmospheric pressure.

9. Method of making a paste having, when in the form of a dry film, the characteristic of a re-moistening gum which consists in cooking at a pressure substantially above atmospheric pressure a mixture of dry roasted corn dextrine and water in an acid condition.

THOMAS A. BRUCE.